April 22, 1924.
G. M. SMITH
1,491,176
METHOD OF FORMING THE WELDING GROOVE IN PIPE COUPLING BLANKS
Filed July 18, 1923
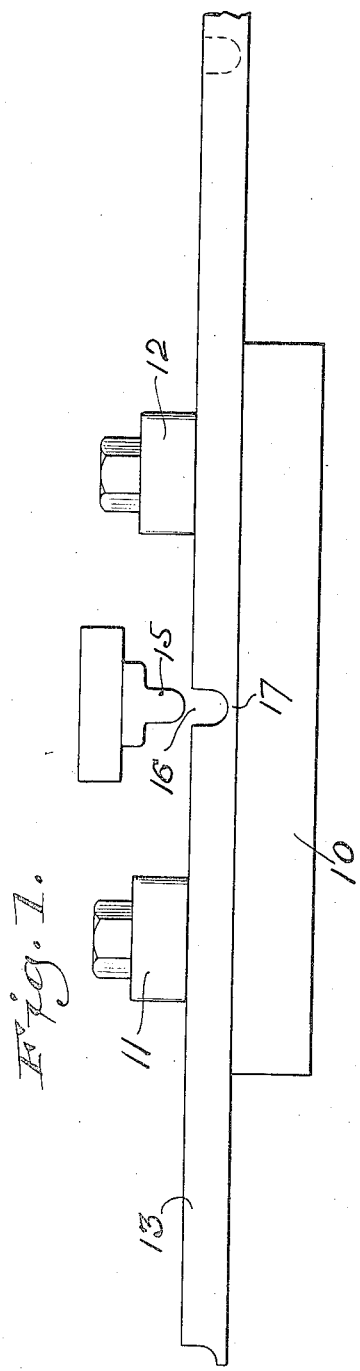
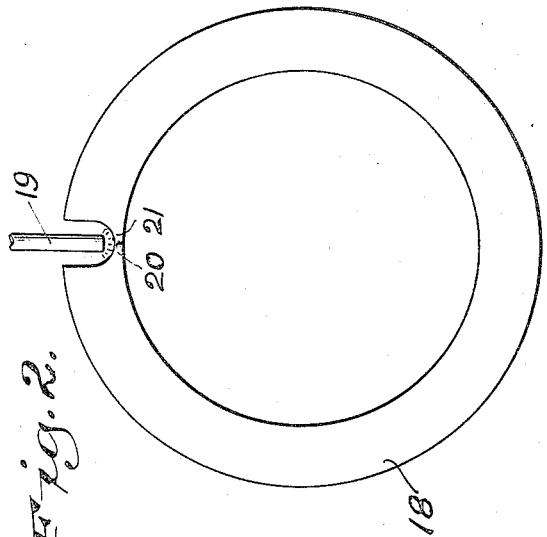
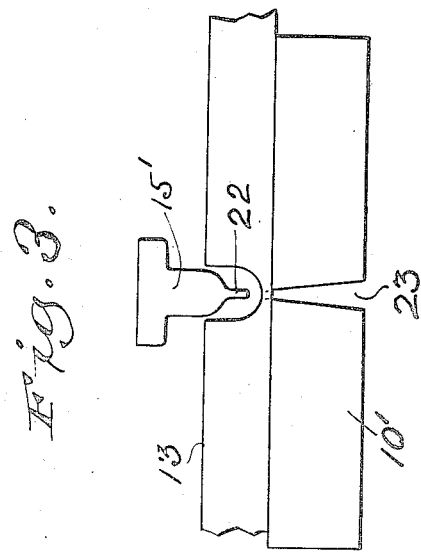
INVENTOR:
George M. Smith,
BY
Crevin, Wheeler & Woodard
ATTORNEYS.

Patented Apr. 22, 1924.

1,491,176

UNITED STATES PATENT OFFICE.

GEORGE M. SMITH, OF MILWAUKEE, WISCONSIN, ASSIGNOR TO A. O. SMITH CORPORATION, OF MILWAUKEE, WISCONSIN, A CORPORATION OF NEW YORK.

METHOD OF FORMING THE WELDING GROOVE IN PIPE-COUPLING BLANKS.

Application filed July 18, 1923. Serial No. 652,290.

*To all whom it may concern:*

Be it known that I, GEORGE M. SMITH, a citizen of the United States, and residing in the city of Milwaukee, in the county of Milwaukee and State of Wisconsin, have invented certain new and useful Improvements in Methods of Forming the Welding Groove in Pipe-Coupling Blanks; and I do declare the following to be a clear, exact, and complete description thereof, such as will enable persons skilled in the art to which the invention pertains to practice the same, reference being had to the accompanying drawing for an illustration of a conventional means and the manner in which the invention may be reduced to practice.

In the production of heavy couplings for joining the sections of pipe of large diameter, such, for instance, as are used in oil wells, it is necessary that the welded joint in the coupling have a tensile strength equal to that of the material of which the coupling is formed, in order to preserve the integrity of the coupling. This result is not always attained in the ordinary smith-craft welding, and it follows sometimes that the later manifestations of defects in the welded joint are attended by damages, which may be more or less serious.

I have found that by arc-welding the abutting ends of the metal plate which is rolled into annular shape to constitute the coupling, a coupling may be produced in which the strength of the welded joint is such that all of the requirements of such a structure are met, and that a coupling having a welded joint effected in this manner will resist all of the strains which may be imposed upon it in use. But on account of the thickness of the metal plate, arc-welding of the abutting ends with an assurance that the desired result will be attained is not always a certainty, it being difficult to effect a proper state of fusion of the said ends at the welding line.

However, by reducing the thickness of the material forming the coupling in the region of the welding line, I produce a groove having at its bottom thinned portions which may be readily and sufficiently fused to permit the metal thereat to be firmly joined. The welding proceeds as a continuous operation, until the groove is filled by a deposit of additional welding material in the form of molten metal flowing from a metallic current conductor produced as a fusible weldrod, fusion of the material of the coupling at the sides of the groove being effected coincidently with the deposit in successive layers of the additional welding material.

In carrying out my invention, I select metal plates having thickness and width proportioned to the size of the pipes to be joined. At measured points in the length of these plates, I press transverse grooves which reduce the material so that the sections between the transverse grooves may be easily severed. The sections are then rolled into annular shape, with the reduced ends in proximate or abutting relation, whereby a welding groove is formed in the coupling blank. The welding then proceeds as before described.

The groove is formed as a very simple operation by securing the plate in immovable position, and pressing a transversely arranged die thereinto to the required depth, the metal at the bottom of the groove being reduced to comparative thinness, to permit it to be severed, with but a small expenditure of power.

In some classes of work, the die may be provided with a cutter which will project sufficiently in advance of the groove forming surface of the die, to effect severance of the plate at the conclusion of the groove forming operation.

The invention will now be described in connection with the drawing, and the novel features thereof pointed out in the appended claims.

In the accompanying drawing:

Figure 1 is a side view in elevation showing a conventional arrangement of means for reducing my invention to practice.

Fig. 2 is an end view of a pipe coupling produced by the practice of my invention and shows the manner in which the welding is performed.

Fig. 3 is a view similar to Fig. 1, showing a modification in the construction of the groove forming die, whereby severance of the sections of the plate may be effected at the conclusion of the groove forming operation.

In the drawing, the numeral 10 indicates the stationary bed of a press, and 11 and 12 clamping devices having for their purpose the holding a metal plate 13 in fixed and immovable position upon the bed of the press, the said plate having its dimensions of thickness and width determined by the uses which will attend the product made therefrom.

A power operated die 15, formed conveniently as a bar of a length not less than the width of the plate 13, is movable in a plane which is transverse to that in which the plate extends, and is actuated to compress the metal strip upon the bed of the press, so as to form a transverse groove 16 upon the face of the plate by displacement of the metal. The groove will be formed with a contour, preferably U-shaped, which is the counter impression of the die, and be of such depth as to have the adjoined sections of the plate connected by a comparatively thin portion 17 at the bottom of the groove, and which will reduce the operation of severing the plate into sections to a very simple matter.

In operation, the plate 13 is positioned by the clamps upon the bed of the press, and a transverse groove 16 impressed near one end thereof. The plate is then moved to its next position, and again clamped and impressed as before, and these operations are repeated throughout the length of the plate. The grooves 16 will be equally spaced in the length of the plate, the distance between such grooves being determined by the diameter of the couplings which are to be made from the sections.

The thinned portion at the bottom of the groove formed by the compression, is then subjected to a transverse cutting operation, whereby the plate is severed into strips of equal length, the opposite ends of which are chamfered. These strips are then rolled into annular shape, forming a ring 18 with the chamfered meeting edges in such proximity that a U-shaped welding groove 19 extending parallel with the axis of the ring is formed in the outer surface of the ring, the thinned projecting edges 20, 21, being brought into or near abutting relation, as shown in Fig. 2.

The coupling blank thus produced is placed in a welding machine, and the metal in the region of the groove fused and welded into an integral structure. By reason of the comparative thinness of the metal at the bottom of the groove, the fusion of the projecting edges 20 and 21 is easily effected by the electric arc. The additional welding material necessary to fill the groove and complete the joint is supplied by a fusible weldrod, the molten metal flowing from the weldrod being deposited in successive layers as the welding proceeds, and the metal at the sides of the groove being properly fused in the lateral vibrations of the weldrod as the successive layers are formed. A joint is thus produced which possesses a capacity for resisting all of the tensile strains to which it may be subjected, inasmuch as its strength is equal to that of the material from which the coupling is formed.

Fig. 3 shows a modification in that the compression die 15' is provided at its bottom with a ridge 22, which is adapted to be forced entirely through the metal plate and sever the same into the required lengths, at the conclusion of the groove-forming operation. In this arrangement, the bed 10' of the press is provided with a slot or opening 23, in register with the ridge 22 on the die, through which the slug punched by the ridge 22 may pass. The coupling blank produced in the combined operation is then rolled into annular shape and welded as before described.

It will obviously be within the scope of my invention to operate upon short sections of metal plates of the required length, by reducing the metal at the ends thereof, either separately or simultaneously, as by placing two plates end to end, and rolling or otherwise converting such sections into annular shape to constitute the welding groove in the coupling.

Having thus described my invention, what I claim and desire to secure by Letters Patent of the United States, is:

1. The method of forming a welding groove in a pipe coupling, which consists in compressing a plate to reduce the metal at the ends thereof, and converting the plate into annular form with the reduced ends in abutting relation to constitute the groove.

2. The method of forming a welding groove in a pipe coupling, which consists in compressing transverse grooves in a metal plate, severing the plate in the line of the grooves to produce sections having reduced ends, and converting the sections into annular shape with the reduced ends in abutting relation.

3. The method of forming a welding groove in pipe couplings, which consists in applying pressure at points in the length of a plate to reduce the metal on transverse lines, severing the plate into sections at the reduced portions, and rolling the plate into annular shape with the reduced ends in abutting relation to constitute the welding groove.

4. The method of making electrically welded pipe couplings, which consists in compressing the ends of a plate to reduce the metal on transversely extending lines, converting the plate into annular shape with the reduced ends in abutting relation to constitute a welding groove, arc welding the said ends, and filling the groove with welding material to complete the structure of the coupling.

In testimony whereof, I have signed my name at Milwaukee, this 12th day of July, 1923.

GEO. M. SMITH.

Witnesses:
W. F. WOOLARD,
EMMA HAUG.